July 3, 1928.
J. MEUNIER
1,676,040
TRACTOR OPERATED STUMP UPROOTING DEVICE
Filed April 5, 1926
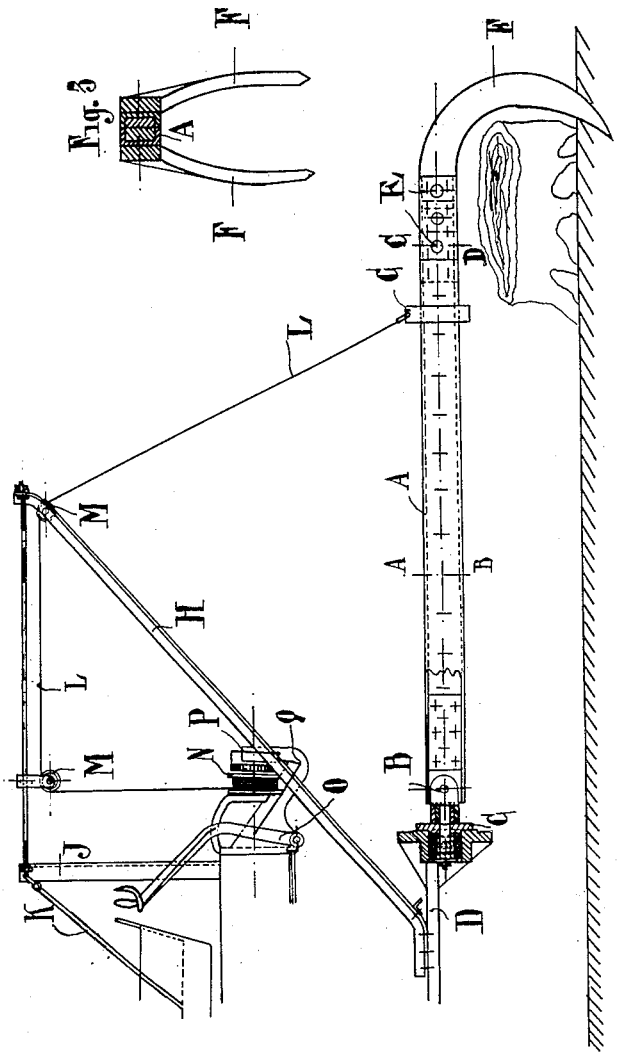
INVENTOR
JULIEN MEUNIER
BY Richards & Geier
ATTORNEYS Patented July 3, 1928.

1,676,040

UNITED STATES PATENT OFFICE.

JULIEN MEUNIER, OF TROARN, CALVADOS, FRANCE.

TRACTOR-OPERATED STUMP-UPROOTING DEVICE.

Application filed April 5, 1926, Serial No. 99,799, and in France May 20, 1925.

The object of my invention is to provide a device that will permit land clearers to use a tractor for uprooting stumps.

In order to make my invention more clearly understood, I have illustrated, as an example, an embodiment thereof in the drawing appended hereto wherein:

Figure 1 is a side elevation, partly in section, of a device constructed according to my invention;

Figure 2 is a section thereof along line A—B of Figure 1;

Figure 3 is a section of the same along line C—D of Figure 1.

My device consists essentially of a hook having a stem or shank A of suitable length which may be of square or other section.

Said stem or shank should preferably be made of hollow iron with a wooden core.

I mount it in such a way that it can pivot at B for vertical movement on a suitable resilient device C fitted on the rear part of the tractor's chassis D.

To the free end of said shank A is secured, by means of bolts E, a suitably shaped two-fanged hook F (Figures 1 and 3).

Said pivoting hook is combined with an operating gear constructed as follows:

A suitably inclined jib H is fixed in rear of device C to the tractor's chassis D.

To the upper end of jib H is secured one end of a guy rod I, the other end of which is secured to an upright J integral with the tractor. One or several guys K ensure rigidity of the whole.

To a collar G, fixed at a suitable point on shank A, is fastened a cable L running on two guide pulleys M—M', mounted respectively on jib H and on guy I, and winding round a winch or drum N controlled by the motor.

A suitable clutch O allows cable L to be, at will, wound and unwound round and from said barrel and, thereby, the tearing up hook to be lifted or let down.

The rachet of a rachet wheel P affords a means to keep the hook up in position.

Said ratchet is lifted through control Q when the clutch is operated as hereinafter explained.

Working is as follows:

While the hook is in raised position I maneuver the tractor so as to bring said hook into place at a suitable distance, say 50 c/m in rear of stump S. I then operate control O in order to lift from its wheel the ratchet P, which retains the device in raised position, and so permit the hook to fall of its own weight in rear of the stump.

I then start the tractor ahead and throw the motor into gear; the hook digs into the ground and, catching the stump underneath uproots it.

Once the stump has been uprooted, I throw the motor out of gear, reverse the tractor to release the hook-fangs, and, at the same time, operate control O to throw the winch into gear, thereby lifting up the hook again, ready for another stump removal.

When the hook is up, I put lever O in vertical position and the ratchet of wheel P then keeps the said hook raised.

I wish to point out that the fixing of double-fanged hook F by means of bolts E constitutes a safety device against breakage of the tractor, for, should resistance prove too great, said bolts would get cut by shearing action and the hook parted from shank A.

Said hook can, of course, be quite easily secured again to the shank by means of new bolts.

Naturally I may provide a device for braking the hoist cable, and, in fact, I reserve the right to introduce any constructional alterations or modifications without being deemed to depart from the scope of my invention.

Having now particularly ascertained and described the nature of my said invention as well as the manner in which the same is to be performed, I declare that what I claim is:

In a tractor-operated stump uprooting apparatus the combination with a tractor frame; of a shank pivotally connected at one end to said tractor frame for vertical movements relative thereto, a hook connected to the other end of said shank for engagement with a stump to be uprooted, a standard supported by said frame, a jib extending upwardly and rearwardly from said frame, a guy-rod extending from said standard and connected to the upper end of said jib, pulleys supported by said jib and rod, a flexible element engaged with said pulleys and having one end connected to said shank, a drum supported by said frame for receiving said flexible element, and means to operate said drum to wind said flexible element thereon and unwind the same therefrom to raise and lower said shank and hook.

In testimony whereof I affix my signature.

JULIEN MEUNIER.